United States Patent
Yu

(10) Patent No.: US 9,303,571 B2
(45) Date of Patent: Apr. 5, 2016

(54) TORQUE MANAGEMENT TECHNIQUES FOR ENGINE SYSTEMS HAVING BELT-DRIVEN STARTER GENERATORS

(71) Applicant: Songping Yu, Troy, MI (US)

(72) Inventor: Songping Yu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 7 days.

(21) Appl. No.: 14/079,214

(22) Filed: Nov. 13, 2013

(65) Prior Publication Data

US 2015/0134227 A1 May 14, 2015

(51) Int. Cl.
G06F 19/00 (2011.01)
F02D 28/00 (2006.01)
B60K 6/485 (2007.10)
B60W 20/00 (2006.01)
F02N 11/04 (2006.01)
F02N 15/08 (2006.01)

(52) U.S. Cl.
CPC ............... *F02D 28/00* (2013.01); *B60K 6/485* (2013.01); *B60W 20/00* (2013.01); *B60W 20/1088* (2013.01); *B60W 2510/244* (2013.01); *B60W 2710/0666* (2013.01); *B60W 2710/083* (2013.01); *F02N 11/04* (2013.01); *F02N 15/08* (2013.01)

(58) Field of Classification Search
USPC ........................... 701/84, 86, 87, 90, 101, 102
See application file for complete search history.

(56) References Cited

U.S. PATENT DOCUMENTS

| 8,311,721 | B2 | 11/2012 | Whitney et al. |
| 8,374,771 | B2 | 2/2013 | Falkenstein |
| 2003/0034187 | A1* | 2/2003 | Hisada et al. ............... 180/65.1 |
| 2006/0169506 | A1* | 8/2006 | Handa et al. ................ 180/65.5 |
| 2008/0305921 | A1* | 12/2008 | Falkestein ........................ 477/3 |
| 2010/0257951 | A1* | 10/2010 | Quincerot ............... F02N 11/10 74/6 |
| 2011/0005850 | A1 | 1/2011 | Colvin et al. |
| 2014/0130635 | A1* | 5/2014 | Kees ..................... F02N 11/006 741/7 R |

FOREIGN PATENT DOCUMENTS

| EP | 0989300 A2 | 3/2000 |
| GB | 2486708 A | 6/2012 |

OTHER PUBLICATIONS

International Search Report and Written Opinion dated Mar. 4, 2015 for International Application No. PCT/US2014/064761, International Filing Date Nov. 10, 2014.

* cited by examiner

*Primary Examiner* — Hung Q Nguyen
*Assistant Examiner* — Ruben Picon-Feliciano
(74) *Attorney, Agent, or Firm* — Ralph E. Smith

(57) ABSTRACT

A method can include determining a desired torque output from an engine system in response to a torque request, the engine system including an engine and a belt-driven starter generator (BSG). The method can include determining a current engine torque capacity. When the desired torque output is greater than the current engine torque capacity, the method can include (i) determining a maximum engine torque capacity, (ii) determining a current BSG torque capacity, (iii) commanding the BSG to operate as a torque generator or a torque consumer based on a difference between the desired torque output and the maximum engine torque capacity and a state of a battery system configured to power the BSG, and (iv) controlling the engine and the BSG to collectively generate the desired torque output at a flywheel of the engine.

20 Claims, 3 Drawing Sheets

TORQUE MANAGEMENT TECHNIQUES FOR ENGINE SYSTEMS HAVING BELT-DRIVEN STARTER GENERATORS

FIELD

The present disclosure relates generally to internal combustion engines and, more particularly, to torque management techniques for engine systems having belt-driven starter generators.

BACKGROUND

Internal combustion engines can combust an air/fuel mixture to drive pistons that rotatably turn a crankshaft to generate drive torque. The drive torque can be transferred from the crankshaft to a drivetrain to propel a vehicle. Mild hybrid vehicles can be temporarily powered using electric motors, which can allow the engines to be periodically turned off to decrease fuel consumption. One example of a mild hybrid vehicle is a vehicle having an engine and a belt-driven starter generator (BSG). The crankshaft of the engine can be coupled to a flywheel and the BSG can be coupled to the flywheel via a belt. When the engine needs to be restarted after a period of inactivity, the BSG can turn the crankshaft using the belt to restart the engine quickly and smoothly.

SUMMARY

In one form, a method is provided in accordance with the teachings of the present disclosure. The method can include determining, at a controller for an engine system comprising an engine, the controller having one or more processors, a desired torque output from the engine system in response to a torque request, wherein the engine is configured to generate torque at a flywheel, and wherein the engine system includes a belt-driven starter generator (BSG) coupled to the flywheel by a belt. The method can include determining, at the controller, a current engine torque capacity. When the desired torque output is greater than the current engine torque capacity, the method can also include: (i) determining, at the controller, a maximum engine torque capacity, (ii) determining, at the controller, a current BSG torque capacity, (iii) commanding, by the controller, the BSG to operate as a torque generator or a torque consumer based on a difference between the desired torque output and the maximum engine torque capacity and a state of a battery system configured to power the BSG, and (iv) controlling, by the controller, the engine and the BSG to collectively generate the desired torque output at the flywheel of the engine.

In another form, an engine system is provided in accordance with the teachings of the present disclosure. The engine system can include an internal combustion engine configured to generate torque at a flywheel in response to a torque request, the torque request indicating a desired torque output of the engine system, the engine being associated with a BSG that is coupled to the flywheel by a belt, the BSG being configured to operate as a torque generator or a torque consumer. The engine system can also include a controller configured to determine a current engine torque capacity. When the desired torque output is greater than the current engine torque capacity, the controller can also be configured to: (i) determine a maximum engine torque capacity, (ii) determine a current BSG torque capacity, (iii) command the BSG to operate as the torque generator or the torque consumer based on a difference between the desired torque output and the maximum engine torque capacity and a state of a battery system configured to power the BSG, and (iv) control the engine and the BSG to collectively generate the desired torque output at the flywheel of the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
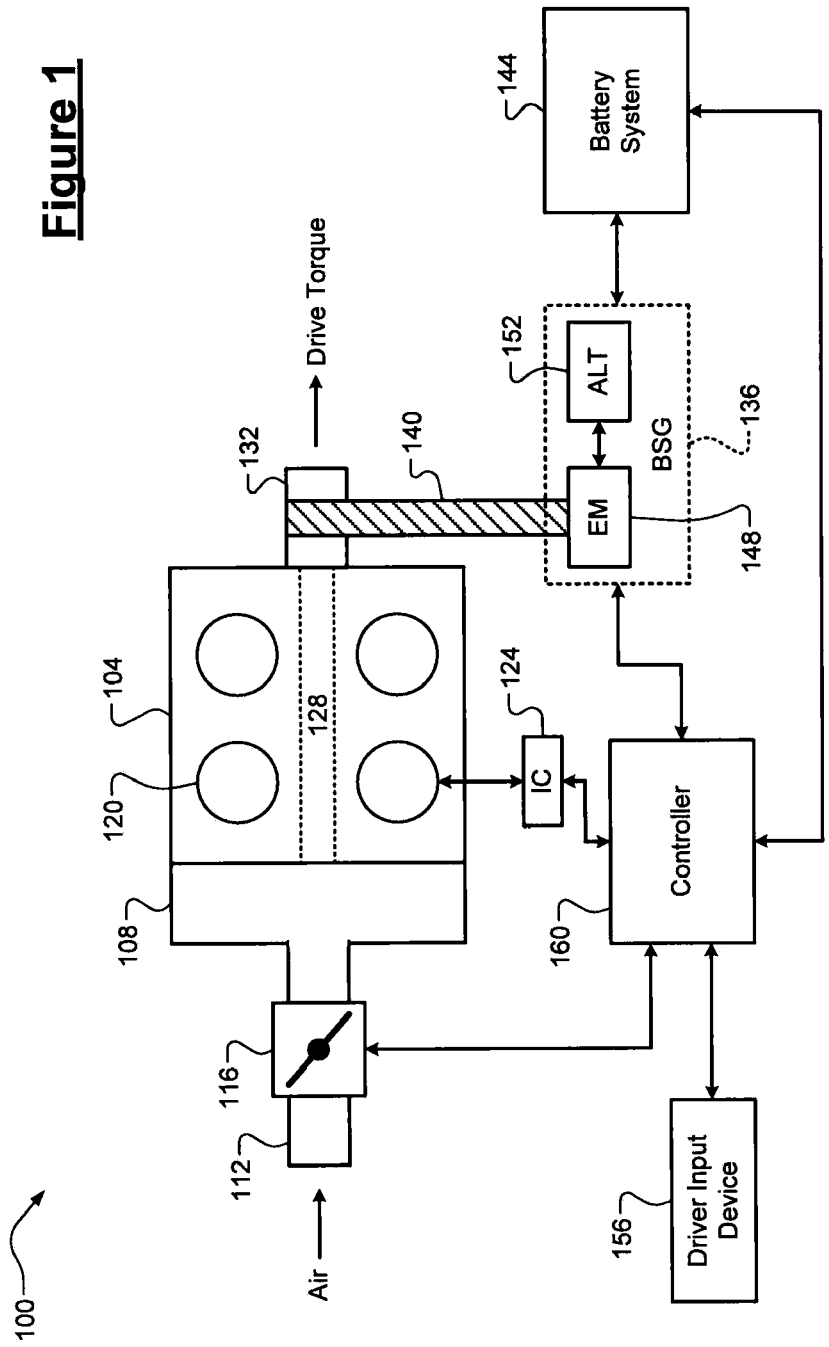
FIG. 1 is an example diagram of an engine system including an internal combustion engine and a belt-driven starter generator (BSG) according to the principles of the present disclosure.

A mild hybrid vehicle having a belt-driven starter generator (BSG) can use the BSG to restart an engine quickly and smoothly after a period of inactivity. The BSG can be powered by a battery system, such as a car battery or a battery pack, and can include an electric motor that can rotatably drive a belt that is coupled to a flywheel of the engine. Torque management systems can control how the engine torque is generated by controlling different engine actuators, some of which provide slow torque response, e.g., airflow, and some of which provide fast torque response, e.g., ignition timing. Adjusting these actuators can generate a torque reserve, which can be used for fast torque delivery when needed. One example torque management technique for generating a torque reserve is ignition timing retardation, which can decrease fuel economy.

The BSG is typically deactivated during operation of the engine. Because the BSG is capable of quickly supplying drive torque at the crankshaft of the engine, however, the BSG could be used as a torque reserve. Utilizing the BSG as a torque reserve can increase fuel economy compared to ignition timing retardation. The BSG, however, is limited by the state of its battery system. In addition, when the engine is operating and the BSG is deactivated, the belt requires at least a desired minimal tension to be able to provide a desired torque response and/or to prevent damage. An electric variable tensioner (EVT) or another suitable tensioner device can be used to maintain at least the desired minimal tension of the belt when the BSG is deactivated during engine operation. These devices, however, can increase vehicle costs.

Accordingly, torque management techniques for engine systems having BSGs are presented. It should be appreciated that the term BSG as used herein can also refer to other suitable mild hybrid vehicle systems. The techniques can utilize the BSG as a torque reserve by commanding the BSG to operate as a torque generator to provide additional torque at the engine flywheel, provided the BSG's battery system is capable of providing sufficient power. When the battery system is incapable of providing sufficient power to the BSG, the BSG can be commanded to operate as a torque consumer to recharge the battery system using a portion of the torque generated by the engine at the engine flywheel. When the BSG cannot provide the additional requested torque, operating parameters of the engine, e.g., ignition timing, can be adjusted to increase its torque output. The torque output of the engine can also be increased above a desired torque output of the engine system when the BSG is operating as a torque consumer so the BSG can recharge the battery system while the engine system outputs the desired torque.

In other words, the BSG and the engine can collectively generate the desired torque output of the engine system at the engine flywheel, although the BSG may be consuming a portion of the actual torque generated by the engine while operating as a torque consumer. Transitioning back and forth between the BSG operating as a torque generator and a torque consumer can be minimized to prevent delay due to inherent belt elasticity. Further, by operating the BSG as a torque generator or a torque consumer, the belt can be maintained at a minimal tension. The techniques can also provide for decreased costs because an EVT is not required to maintain the minimal tension of the belt coupling the BSG to the flywheel of the engine. Instead, the techniques provide for operating the BSG during the whole time period of the BSG being active as either a torque generator or a torque consumer, and thus the belt always has at least the desired minimal tension.

Referring now to FIG. 1, an example diagram of an engine system 100 is illustrated. The engine system 100 can include an internal combustion engine 104 (hereinafter "engine 104"). The engine 104 can be any suitable engine configured to combust an air/fuel mixture to generate drive torque (a spark ignition engine, a diesel engine, a homogeneous charge compression ignition engine, etc.). The fuel may be gasoline or another suitable combustible fuel (ethanol, natural gas, propane, hydrogen, etc.). The engine system 100 can be implemented in a vehicle, and the drive torque generated by the engine 104 can be used to propel the vehicle using a transmission and suitable drivetrain components (one or more differentials, two or more wheels, etc.).

The engine 104 can draw air into an intake manifold 108 through an induction system 112 that can be regulated by a throttle 116. The air in the intake manifold 108 can be distributed to a plurality of cylinders 120 and combined with fuel, e.g., gasoline, from fuel injectors (not shown) to create an air/fuel mixture. While four cylinders are shown, it should be appreciated that the engine 104 can include other numbers of cylinders. The air/fuel mixture can be compressed and combusted within the cylinders 120 to drive pistons (not shown) that rotatably turn a crankshaft 128 to generate drive torque. An ignition controller (IC) 124 can control timing of combustion of the air/fuel mixture, e.g., spark plug timing. The drive torque can be transferred to vehicle drivetrain components (not shown) via a flywheel 132 that is coupled to the crankshaft 128.

The engine system 100 can also include a BSG 136. The BSG 136 can be coupled to the flywheel 132 via a belt 140. The drive torque at the flywheel 132 can be at least partially transferred to the BSG 136 via the belt 140. This can be referred to as the BSG 136 operating as a "torque consumer." Similarly, the BSG 136 can at least partially drive the flywheel 132 via the belt 140 in order to drive the crankshaft 128, e.g., during engine restarts. This can be referred to as the BSG 136 operating as a "torque generator." While operating as a torque generator, the BSG 136 can be a torque reserve for the engine 104. The BSG 136 can be powered by a battery system 144. The battery system 144 can be a single battery, e.g., a typical 12 volt lead-acid car battery, or a battery pack comprising a plurality of batteries, e.g., a 48 volt lithium-ion battery pack.

In one implementation, the BSG 136 can include an electric motor (EM) 148 and an alternator (ALT) 152. The electric motor 148 can be coupled to the belt 140 and can either drive the flywheel 132 or be driven by the flywheel 132, depending on the mode of operation of the BSG 136. When driving the flywheel 132, the electric motor 148 can be powered by a current provided by the battery system 144. The capability of the BSG 132 to operate as a torque generator, therefore, can depend on the state of the battery system 144. For example, the BSG 132 may be prohibited from operating as a torque generator when a state-of-charge (SOC) of the battery system 144 is below a predetermined threshold. Alternatively, when being driven by the flywheel 132, the electric motor 148 and the alternator 152 can collectively generate a current, which may be used to recharge the battery system 144.

The engine 104 can generate a desired torque based on driver input via a driver input device 156, e.g., an accelerator pedal. The driver input can represent a torque request for the engine system 100. A controller 160 can control operation of the engine system 100 and, more particularly, can control components of the engine system 100 to deliver the torque request. These components for delivering the torque request can include slow-actuation components (airflow, fuel, etc.) and fast-actuation components (spark, BSG, etc.). The controller 160 can control the airflow by controlling the throttle 116 and can control ignition timing by controlling the ignition controller 124. The controller 160 can also control the BSG 136 by selectively powering the electric motor 148 according to a specified duty cycle and using a current from the battery system 144, which is described in greater detail below.

Figure 2:
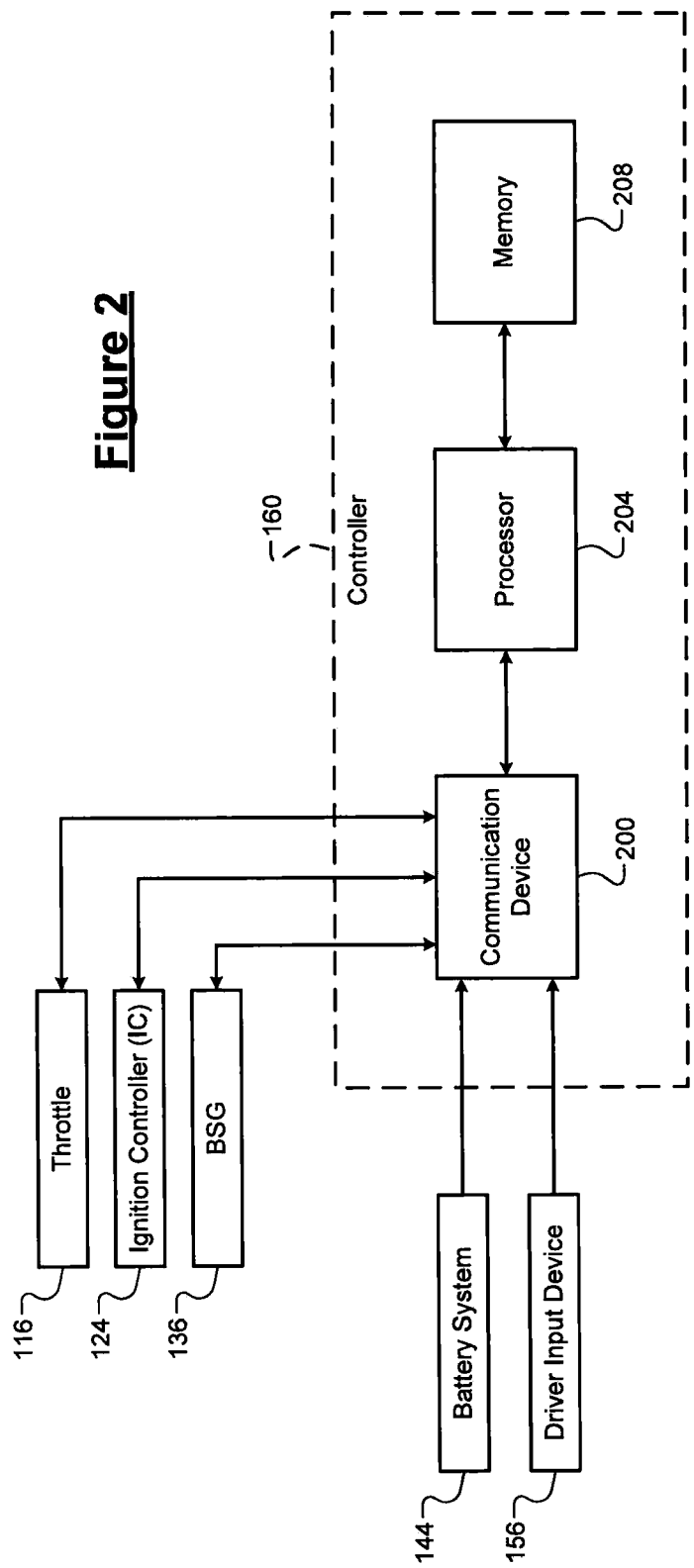
FIG. 2 is an example functional block diagram of a controller of the engine system according to the principles of the present disclosure.

Referring now to FIG. 2, an example functional block diagram of the controller 160 is illustrated. The controller 160 can include a communication device 200, a processor 204, and a memory 208. It should be appreciated that the term "processor" as used herein can refer to both a single processor and two or more processors operating in a parallel or distributed architecture. The memory 208 can be any suitable storage medium (flash, hard disk, etc.) configured to store information at the controller 160. For example, the memory 208 may store the predetermined threshold(s) for the battery system 144 and/or the BSG torque coefficient, which are described in greater detail below.

The communication device 200 can include any suitable components, e.g., a transceiver, configured for communication with components of the engine system 100 via a controller area network (CAN) (the throttle 116, the ignition controller 124, the BSG 136, the battery system 144, the driver input device 156, etc.). It should be appreciated that the communication device 200 can also be configured to communicate with other components (a remote server, a mobile phone, another vehicle, etc.) via another network, such as a local area network (LAN), e.g., Bluetooth communication, or a wide area network (WAN), e.g., the Internet.

The processor 204 can be configured to control operation of the controller 160. These functions can include, but are not limited to, loading/executing an operating system of the controller 160, controlling information sent via the communication device 200, processing information received via the communication device 200, and controlling read/write operations at the memory 208. The processor 204 can also wholly or partially execute the torque management techniques of the present disclosure, which are now described in greater detail below.

Specifically, the processor 204 can determine a desired torque output from the engine system 100 ($T_{desired}$) in response to a torque request. The torque request can be based on drive input via the driver input device 156. The desired torque output from the engine system 100 represents a desired torque at the flywheel 132 of the engine 104. The torque at the flywheel 132 can be provided from the engine 104 or a combination of the engine 104 and the BSG 136 operating as a torque generator.

The processor 204 can determine a current engine torque capacity ($ET_{current}$). The current engine torque capacity can represent a torque capacity of the engine 104 at current operating parameters (airflow, ignition timing, etc.). In other words, the current engine torque capacity can represent a maximum amount of torque that the engine 104 can generate at the current operating parameters.

The processor 204 can then determine whether the desired torque output of the engine system 100 is greater than the current engine torque capacity. When the desired torque output of the engine system 100 is less than or equal to the current engine torque capacity, the processor 204 can control the engine 104 via the communication device 200 to generate the desired torque output at the flywheel 132 because the engine 104 is capable of generating all of the desired torque output for the engine system 100.

When the desired torque output is greater than the current engine torque capacity, however, the processor 204 can determine a maximum engine torque capacity. The maximum engine torque capacity can represent a maximum torque capacity of the engine 104 at any operating parameters (airflow, ignition timing, etc.). In other words, the maximum engine torque capacity can represent a maximum amount of torque that the engine 104 can generate by adjusting one or more of the operating parameters.

The processor 204 can determine a current BSG torque capacity. The current BSG torque capacity can represent a torque capacity of the BSG 136 at current operating parameters, e.g., rotational speed. The rotational speed of the BSG 136 can be the rotational speed of the electric motor 148. In other words, the current BSG torque capacity can represent a maximum amount of torque that the BSG 136 (the electric motor 148) can generate at the current operating parameters.

The processor 204 can then command the BSG 136 via the communication device 200 to operate as a torque generator or a torque consumer based on a difference between (i) the desired torque output of the engine system 100 and the maximum engine torque capacity and (ii) a state of the battery system 144. For example, the state of the battery system 144 can be a state-of-charge (SOC), e.g., a percentage, which could be measured by a sensor (not shown) that is associated with the battery system 144.

Specifically, the processor 204 can command the BSG 136 to operate as a torque consumer when the state of the battery system 144 indicates that the BSG 136 (the electric motor 148) would be incapable of operating as a torque generator to generate torque at the flywheel 136 for a sustainable period of time. The processor 204 may determine that the BSG 136 would be incapable of operating as a torque generator when the SOC of the battery system 144 is less than a first predetermined threshold, e.g., <25%.

Similarly, the processor 204 can command the BSG 136 to operate as a torque generator when the state of the battery system 144 indicates that the BSG 136 (the electric motor 148) would be capable of operating as a torque generator to generate torque at the flywheel 136 for a reasonable period of time. The processor 20 may determine that the BSG 136 would be capable of operating as a torque generator when the SOC of the battery system 144 is greater than a second predetermined threshold, e.g., >75%.

There could also be states of the battery system 144 where the BSG 136 could operate as either a torque generator or a torque consumer. For example, when the SOC of the battery system 144 is approximately 50%, the BSG 136 could operate as either a torque generator or a torque consumer. For example only, the first predetermined threshold could be 25% and the second predetermined threshold could be 75%, leaving a 50% region in the middle where the BSG 136 could operate as either a torque generator or a torque consumer. In these cases, the processor 204 can determine whether to command the BSG 136 to operate as a torque generator or a torque consumer based on other suitable parameters, e.g., loss in fuel economy by performing ignition timing retardation instead.

After determining whether to operate the BSG 136 as a torque generator or a torque consumer, the processor 204 can control the engine 104 and the BSG 136 (the electric motor 148) via the communication device 200 to collectively generate the desired torque output at the flywheel 132 of the engine 104. In some cases, the BSG 136 may be capable of generating enough torque at the flywheel 132 such that the engine 104 can continue operating at the current operating parameters (airflow, ignition timing, etc.). In other cases, the processor 204 may adjust the operating parameters of the engine 104 to increase its torque output at the flywheel 132, up to the maximum engine torque capacity, if necessary.

More specifically, the processor 204 can control the engine 104 via the communication device 200 to generate a sum of (i) the desired torque output and (ii) a portion of the current BSG torque capacity at the flywheel 132 of the engine 104 when the BSG 136 is commanded to operate as the torque consumer. In these situations, the BSG 136 can be configured to consume the portion of the current BSG torque capacity generated by the engine 104 at the flywheel 132. The consumed torque can be transferred from the electric motor 148 to the alternator 152, which can convert the consumed torque to a current for recharging the battery system 144.

Alternatively, the processor 204 can control the engine 104 via the communication device 200 to generate a difference between (i) the desired torque output and (ii) the portion of the current BSG torque capacity when the BSG 136 is commanded to operate as a torque generator. In these situations, the BSG 136 can be configured to generate the portion of the current BSG torque capacity at the flywheel 132. The battery system 144 can provide a current to the BSG 136, and the BSG 136 (the electric motor 148) can provide the portion of the current BSG torque capacity at the flywheel 132. The processor 204 can also command the BSG 136 (the electric motor 148) to operate according to a specific duty cycle based on (i) the torque to be generated by the BSG 136 at the flywheel 132 and (ii) the rotational speed of the BSG 136.

In one example implementation, the processor 204 can calculate the portion of the current BSG torque capacity based on a product of (i) a coefficient ($K_{coef}$) and (ii) the current BSG torque capacity. The coefficient can represent a multiplication coefficient for determining a nominal level of BSG torque generation. The coefficient can be a value between zero and one. In some implementations, the coefficient can be set to approximately 0.5 to provide an optimal response time by the BSG 136 when an expected magnitude of the desired torque output is unknown. By utilizing a coefficient of approximately 0.5, switching between operating the BSG 136 as a torque generator and a torque consumer can be avoided to eliminate response delays due to the elasticity of the belt 140, which is discussed in greater detail below.

In some implementations, the coefficient can be greater than but approximately equal to zero, e.g., 0.01, when (i) the desired torque output is expected to be greater than the current engine torque capacity to maintain at least a minimal tension of the belt 140 and the BSG 136 is operating as a torque generator, or (ii) the desired torque output is expected to be less than the current engine torque capacity to maintain at least the minimal tension of the belt 140 and the BSG 136 is operating as a torque consumer. Similarly, for example, the coefficient can be equal to or approximately equal to one when (i) the desired torque output is expected to be less than the current engine torque capacity and the BSG 136 is operating as a torque generator, or (ii) the desired torque output is expected to be greater than the current engine torque capacity and the BSG 136 is operating as a torque consumer.

As mentioned above, the coefficient can be utilized to avoid switching between operating the BSG 136 as a torque generator and a torque consumer. Continuously switching between these modes of operation for the BSG 136 can cause response delays for the BSG 136 due to the inherent elasticity of the belt 140. Every time the BSG 136 switches from a torque consumer to a torque generator, or vice-versa, the belt 140 switches from being driven by the flywheel 132 to being driven by the BSG 136, or vice-versa, respectively.

Due to the inherent elasticity of the belt 140, this mode switch/transition can cause a delay in torque response (at the BSG 136, for torque consuming, or at the flywheel 132, for torque generation). In other words, by utilizing the coefficient, the frequency of mode switches/transitions by the BSG 136 can be decreased to achieve better responsiveness. For example, the coefficient can be set to 0.5 to provide the optimal response of the BSG 136. By utilizing a coefficient of approximately 0.5, the BSG 136 is limited to providing its median torque output (half of its capacity), providing for better responsiveness.

Figure 3:
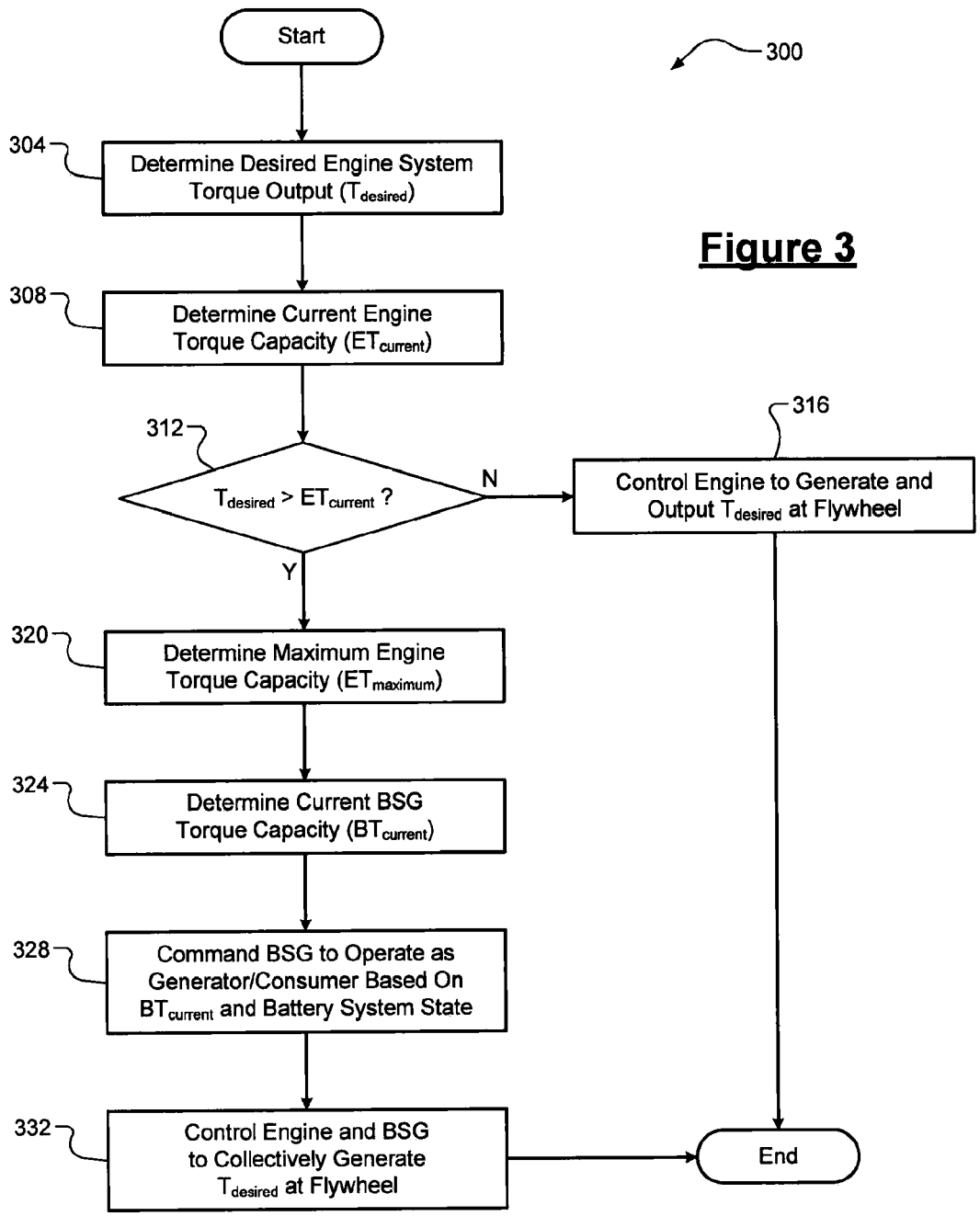
FIG. 3 is an example flow diagram of a method of torque management for an engine system having a BSG according to the principles of the present disclosure.

Referring now to FIG. 3, an example flow diagram of a method 300 of torque management for an engine system having a BSG is illustrated. For illustrative purposes, the method 300 is described with respect to the engine system 100.

At 304, the controller 160 can determine a desired torque output from the engine system 100 ($T_{desired}$) in response to a torque request, e.g., from the driver input device 156. At 308, the controller 160 can determine a current engine torque capacity ($ET_{current}$). At 312, the controller 160 can determine whether the desired torque output is greater than the current engine torque capacity. If false, the method 300 can proceed to 316. If true, the method 300 can proceed to 320. At 316, the controller 160 can control the engine 104 to generate the desired toque output at the flywheel 132 when the desired torque output is less than or equal to the current engine torque capacity. The method 300 can then end or return to 304 for one or more additional cycles.

At 320, the controller 160 can determine a maximum engine torque capacity ($ET_{maximum}$). At 324, the controller 160 can determine a current BSG torque capacity ($BT_{current}$). At 328, the controller 160 can command the BSG 136 to operate as a torque generator or a torque consumer based on a difference between (i) the desired torque output and the maximum engine torque capacity and (ii) a state of the battery system 144 configured to power the BSG 136. At 332, the controller 160 can control the engine 104 and the BSG 136 to collectively generate the desired torque output at the flywheel 132 of the engine 104. The method 300 can then end or return to 304 for one or more additional cycles.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
   determining, at a controller for an engine system comprising an engine, the controller having one or more processors, a desired torque output from the engine system in response to a torque request, wherein the engine is configured to generate torque at a flywheel, and wherein the engine system includes a belt-driven starter generator (BSG) coupled to the flywheel by a belt and an absence of a variable tensioner;
   determining, at the controller, a current engine torque capacity; and
   when the desired torque output is greater than the current engine torque capacity:
   (i) determining, at the controller, a maximum engine torque capacity;
   (ii) determining, at the controller, a current BSG torque capacity;
   (iii) commanding, by the controller, the BSG to continuously operate as either a torque generator or a torque consumer while the engine is running based on a difference between the desired torque output and the maximum engine torque capacity and a state of a battery system configured to power the BSG;
   (iv) maintaining, by the controller, a desired minimum tension on the belt without requiring the variable tensioner by continuously operating the BSG as either the torque generator or the torque consumer while the engine is running; and
   (v) controlling, by the controller, the engine and the BSG to collectively generate the desired torque output at the flywheel of the engine.

2. The method of claim 1, further comprising:
   controlling, by the controller, the engine to generate a sum of (i) the desired torque output and (ii) a portion of the current BSG torque capacity at the flywheel of the engine when the BSG is commanded to operate as the torque consumer, wherein the BSG is configured to consume the portion of the current BSG torque capacity generated at the flywheel; and controlling, by the controller, the engine to generate a difference between (i) the desired torque output and (ii) the portion of the current BSG torque capacity when the BSG is commanded to operate as a torque generator, wherein the BSG is configured to generate the portion of the current BSG torque capacity at the flywheel.

3. The method of claim 2, wherein the BSG includes an electric motor configured to generate the portion of the current BSG torque capacity at the flywheel using a current from the battery system while the BSG is operating as a torque generator.

4. The method of claim 3, wherein commanding the BSG to operate as a torque generator includes controlling, by the controller, the BSG according to a duty cycle, wherein the duty cycle is based on (i) the portion of the current BSG torque capacity generated by the BSG at the flywheel and (ii) a rotational speed of the BSG.

5. The method of claim 3, wherein the BSG further includes an alternator configured to generate a current recharge the battery system using the portion of the current BSG torque capacity consumed by the electric motor while the BSG is operating as a torque consumer.

6. The method of claim 2, further comprising calculating, at the controller, the portion of the current BSG torque capacity based on a product of (i) a coefficient and (ii) the current BSG torque capacity, wherein the coefficient is a value between zero and one.

7. The method of claim 6, wherein the coefficient is approximately 0.5 to provide an optimal response time by the BSG when an expected magnitude of the desired engine torque is unknown.

8. The method of claim 7, wherein the coefficient of approximately 0.5 causes the BSG to switch less frequently between operating as a torque generator and a torque consumer to eliminate response delays due to an inherent elasticity of the belt.

9. The method of claim 6, wherein:
the coefficient is greater than but approximately equal to zero when (i) the desired torque output is expected to be greater than the current engine torque capacity and the BSG is operating as a torque generator, or (ii) the desired torque output is expected to be less than the current engine torque capacity and the BSG is operating as a torque consumer; and
the coefficient is equal to or approximately equal to one when (i) the desired torque output is expected to be less than the current engine torque capacity to maintain at least a desired minimal tension of the belt and the BSG is operating as a torque generator, or (ii) the desired torque output is expected to be greater than the current engine torque capacity to maintain at least the desired minimal tension of the belt and the BSG is operating as a torque consumer.

10. The method of claim 1, further comprising controlling, by the controller, the engine to generate the desired torque output at the flywheel when the desired torque output is less than or equal to the current engine torque capacity.

11. An engine system, comprising:
an internal combustion engine configured to generate torque at a flywheel in response to a torque request, the torque request indicating a desired torque output of the engine system;
a belt-driven starter generator (BSG) coupled to the flywheel by a belt and configured to continuously operate as either a torque generator or a torque consumer while the engine is running to maintain a desired minimum tension on the belt such that the BSG is not associated with a variable tensioner configured to maintain the desired minimum tension on the belt; and
a controller configured to:
determine a current engine torque capacity; and
when the desired torque output is greater than the current engine torque capacity:
(i) determine a maximum engine torque capacity;
(ii) determine a current BSG torque capacity;
(iii) command the BSG to operate as the torque generator or the torque consumer based on a difference between the desired torque output and the maximum engine torque capacity and a state of a battery system configured to power the BSG; and
(iv) control the engine and the BSG to collectively generate the desired torque output at the flywheel of the engine.

12. The engine system of claim 11, wherein the controller is further configured to:
control the engine to generate a sum of (i) the desired torque output and (ii) a portion of the current BSG torque capacity at the flywheel of the engine when the BSG is commanded to operate as the torque consumer, wherein the BSG is configured to consume the portion of the current BSG torque capacity generated at the flywheel; and
control the engine to generate a difference between (i) the desired torque output and (ii) the portion of the current BSG torque capacity when the BSG is commanded to operate as a torque generator, wherein the BSG is configured to generate the portion of the current BSG torque capacity at the flywheel.

13. The engine system of claim 12, wherein the BSG includes an electric motor configured to generate the portion of the current BSG torque capacity at the flywheel using a current from the battery system while the BSG is operating as a torque generator.

14. The engine system of claim 13, wherein the controller is configured to command the BSG to operate as a torque generator by controlling the BSG according to a duty cycle, wherein the duty cycle is based on (i) the portion of the current BSG torque capacity generated by the BSG at the flywheel and (ii) a rotational speed of the BSG.

15. The engine system of claim 13, wherein the BSG further includes an alternator configured to generate a current recharge the battery system using the portion of the current BSG torque capacity consumed by the electric motor while the BSG is operating as a torque consumer.

16. The engine system of claim 12, wherein the controller is further configured to calculate the portion of the current BSG torque capacity based on a product of (i) a coefficient and (ii) the current BSG torque capacity, wherein the coefficient is a value between zero and one.

17. The engine system of claim 16, wherein the coefficient is approximately 0.5 to provide an optimal response time by the BSG when an expected magnitude of the desired engine torque is unknown.

18. The engine system of claim 17, wherein the coefficient of approximately 0.5 causes the BSG to switch less frequently between operating as a torque generator and a torque consumer to eliminate response delays due to an inherent elasticity of the belt.

19. The engine system of claim 16, wherein:
the coefficient is greater than but approximately equal to zero when (i) the desired torque output is expected to be greater than the current engine torque capacity and the BSG is operating as a torque generator, or (ii) the desired torque output is expected to be less than the current engine torque capacity and the BSG is operating as a torque consumer; and the coefficient is equal to or approximately equal to one when (i) the desired torque output is expected to be less than the current engine torque capacity to maintain at least a desired minimal tension of the belt and the BSG is operating as a torque generator, or (ii) the desired torque output is expected to be greater than the current engine torque capacity to maintain at least the desired minimal tension of the belt and the BSG is operating as a torque consumer.

20. The engine system of claim 11, wherein the controller is further configured to control the engine to generate the desired torque output at the flywheel when the desired torque output is less than or equal to the current engine torque capacity.

* * * * *